United States Patent [19]

Ringle et al.

[11] Patent Number: 5,685,210
[45] Date of Patent: Nov. 11, 1997

[54] APPARATUS AND METHOD FOR DETECTING MISORIENTED WHEEL ASSEMBLIES

[75] Inventors: Glenn Christie Ringle, Monroe; David Lee Strunk, LaSalle, both of Mich.

[73] Assignees: Ford Motor Company; Ford Global Technologies, Inc., both of Dearborn, Mich.

[21] Appl. No.: 191,903

[22] Filed: Feb. 4, 1994

[51] Int. Cl.⁶ .................. B26F 1/02; B26D 5/26
[52] U.S. Cl. .................. 83/13; 83/63; 83/371; 83/522.12
[58] Field of Search .................. 83/13, 55, 620, 83/361, 365, 367, 371, 522.12, 63; 29/406, 407, 894.35, 720, 721

[56] References Cited

U.S. PATENT DOCUMENTS

| | | | |
|---|---|---|---|
| 2,692,527 | 10/1954 | Wetzel et al. | 88/14 |
| 3,706,134 | 12/1972 | Sweeney et al. | 29/629 |
| 3,765,075 | 10/1973 | Olney, Jr. et al. | 29/203 B |
| 4,003,133 | 1/1977 | Pierik | 33/228 |
| 4,288,180 | 9/1981 | Trevarrow | 408/2 |
| 4,295,198 | 10/1981 | Copeland et al. | 364/515 |
| 4,555,968 | 12/1985 | Raney et al. | 83/371 |
| 4,589,184 | 5/1986 | Asano et al. | 29/430 |
| 4,594,789 | 6/1986 | Marino et al. | 33/288 |
| 4,647,208 | 3/1987 | Bieman | 356/375 |
| 4,654,949 | 4/1987 | Pryor | 29/407 |
| 4,868,649 | 9/1989 | Gaudin | 358/101 |
| 4,909,869 | 3/1990 | Sakamoto et al. | 156/64 |
| 5,084,959 | 2/1992 | Ando et al. | 29/740 |
| 5,206,720 | 4/1993 | Clothiaux et al. | 358/101 |

FOREIGN PATENT DOCUMENTS

| | | |
|---|---|---|
| 58-192736 | 11/1983 | Japan . |
| 61-219538 | 9/1986 | Japan . |
| 61-241037 | 10/1986 | Japan . |

*Primary Examiner*—Rinaldi I. Rada
*Assistant Examiner*—Alan Schrock
*Attorney, Agent, or Firm*—Joseph W. Malleck; Roger L. May

[57] ABSTRACT

A method and apparatus for detecting misoriented wheel assemblies in wheel truing machine punch stations. The wheel assemblies for which determination of proper orientation is sought are provided with at least one reference hole, preferably a valve stem hole extending therethrough at a predetermined location. The apparatus includes a light emitting source which is provided in electrical communication with a light detecting target. The light emitting source and the light detection target are disposed in predetermined positions and orientations on opposing sides of the wheel assemblies when received within the punch station. When the light emitting source is engaged during proper wheel assembly orientation, the light beam will pass through the selected reference hole whereupon it will be received and detected by the light detecting target. Control circuitry which is provided in electrical communication with the light detecting target is operative to engage the punch tooling once proper orientation has been confirmed or, in the alternative, abort the punching operation in the case of detected misalignments.

11 Claims, 3 Drawing Sheets

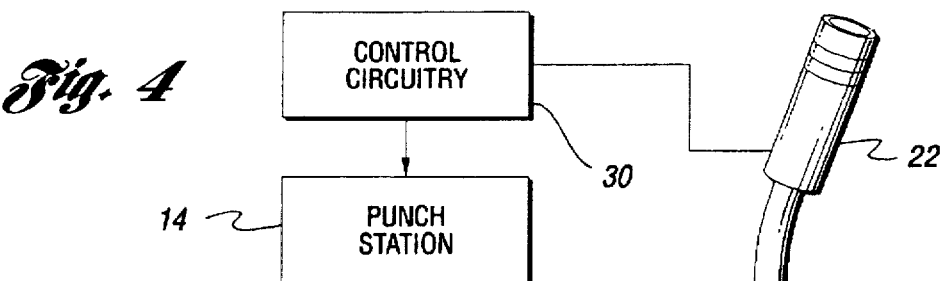
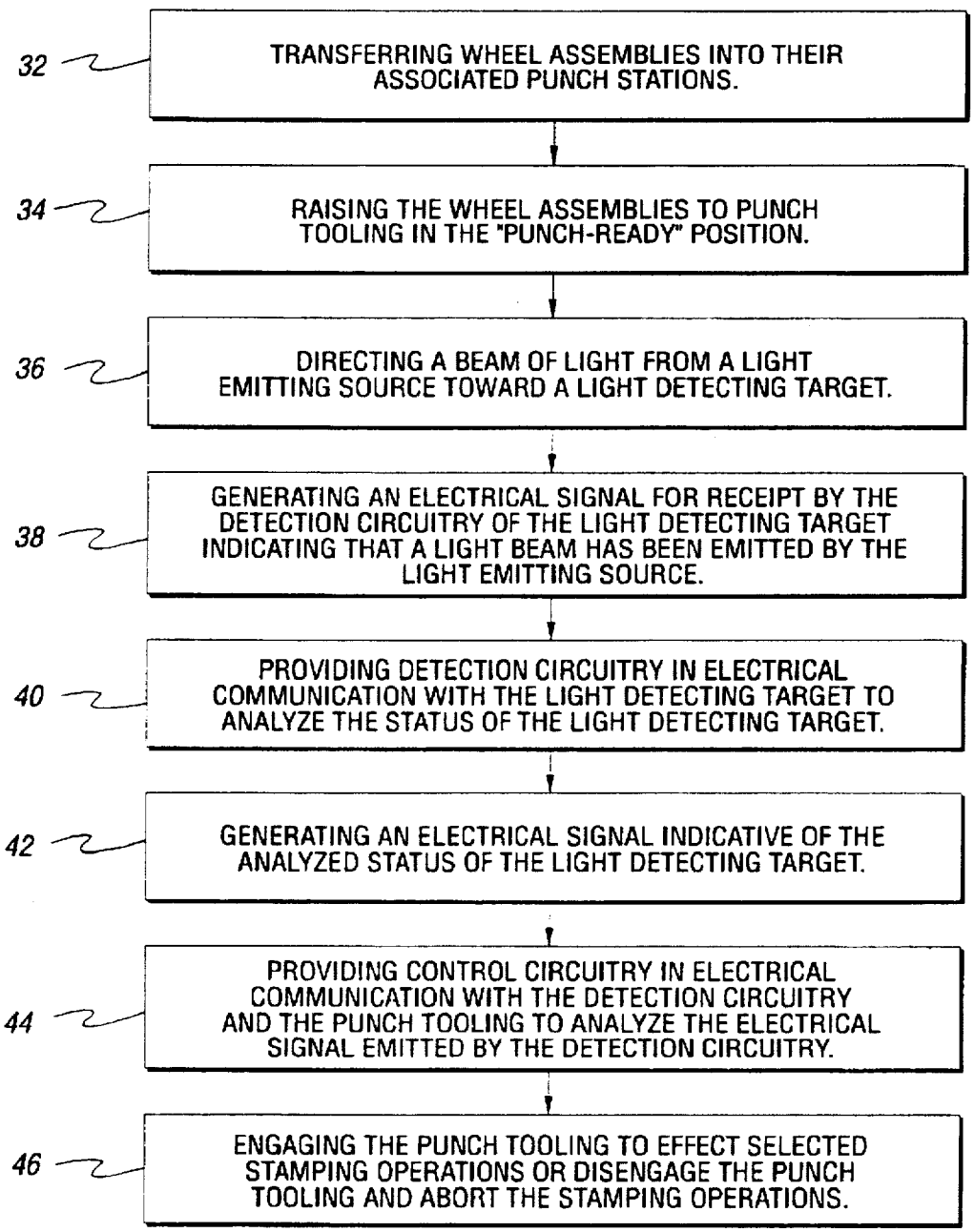

APPARATUS AND METHOD FOR DETECTING MISORIENTED WHEEL ASSEMBLIES

TECHNICAL FIELD

This invention relates to an apparatus and method for detecting misoriented wheel assemblies in wheel truing machine punch stations.

BACKGROUND ART

The formation of wheel assemblies for motor vehicles is a highly automated process. This process has generally required the use of one or more workstations equipped with truing machinery and punch tooling for performing selected cutting and stamping operations. As those skilled in the art will recognize, typical cutting operations include, for example, the truing of tire bed seats and the side surfaces of wheel webs to remove excess metal as shown and disclosed in U.S. Pat. No. 4,288,180 issued to Trevarrow. Similarly, typical stamping operations performed by truing machines of the type referenced above include, for example, the piercing of multiple lug holes. These holes are adapted to receive corresponding lug bolts which, in turn, are received by the corresponding axle of the motor vehicle to retain and manipulate the associated wheel assembly.

To ensure that the above-described truing and stamping operations are performed with the desired accuracy, it is necessary that each of the wheel assemblies be positioned properly within the corresponding workstation before initiation of the selected operation. As readily seen, in cases where the wheel assemblies are misoriented or are otherwise misaligned within the workstation, an improper and undesirable amount of surface metal may be removed during the cutting operations resulting in a misformed and potentially inferior wheel assembly. The stamping operations may be similarly affected thus resulting in the piercing of holes which are potentially off-center from their ideal locations or are otherwise out of tolerance. As those skilled in the art will recognize, when punching lug holes, stamping accuracy is of prime importance since even minor imperfections may result in misalignments of the associated lug nuts which is unacceptable from an operability standpoint.

Against this background, it is understood that efforts have been made to mechanically determine angular misalignments of wheel assemblies within workstations prior to initiation of prior art cutting operations. See, for example, the '180 patent issued to Trevarrow and referenced above which discloses the use of gauging switches.

Efforts have been similarly made to electronically monitor the positions of tire components during assembly and alignment operations. See, for example, U.S. Pat. No. 5,206,720 issued to Clothiaux et al. and assigned to Bridgestone Corporation which discloses the use of illumination means for illuminating edge portions of the corresponding tire components to determine undesirable lateral displacements.

See also, U.S. Pat. No. 4,594,789 issued to Marino et al. and assigned to Bear Automotive Service Equipment Company, which discloses a wheel alignment measurement system which uses photodetector arrays to measure the angular relationships of the vehicle wheels.

There is currently, however, no adequate process to detect whether wheel assemblies are in correct positions within their associated workstations before the initiation of stamping operations of the type to which the present invention is directed. More specifically, there are no adequate apparatti or processes to detect whether vehicle wheel assemblies are in proper alignment before lug holes are pierced therethrough. As a result, lug holes are frequently pierced off-center from their ideal locations as referenced above, and in many cases, are rendered unusable without further modification or repair. In extreme cases, the misformed wheel assemblies must be scrapped at substantial labor and material cost as well as attendant manufacturing delay.

SUMMARY OF THE INVENTION

It is a principal object of the present invention to provide an apparatus and method for detecting misoriented wheel assemblies in cooperation with a wheel truing machine having a punch station and punch tooling for effecting selected stamping operations in a wheel assembly.

A more specific object of the present invention is the provision of an apparatus and method for detecting misoriented wheel assemblies in the punch station of a wheel truing machine operative to pierce lug holes in the associated wheel assemblies at predetermined locations.

Still further, a more specific object of the present invention is the provision of an apparatus and method for detecting misoriented wheel assemblies in the punch station of a wheel truing machine which incorporates the use of a light emitting source and a light receiving target, the light emitting source operative to generate a light beam which, when the wheel assembly is properly oriented, will pass through a predetermined reference hole, and preferably a valve stem hole, for receipt by the light detecting target.

Still further, a more specific object of the present invention is the provision of an apparatus and method for detecting misoriented wheel assemblies so as to prevent lug holes from being punched off location, the method and apparatus incorporating the use of fiber-optic photo-electric sensors operative to transmit and receive a beam of infrared light.

In carrying out the above objects and other objects and features of the present invention, the apparatus and method of the invention disclosed herein are directed for use in cooperation with a wheel truing machine having a punch station and punch tooling for effecting selected stamping operations. These operations include by way of example, but not limitation, the piercing of lug holes in wheel assemblies. The wheel assemblies for which a determination of proper orientation is sought, are provided with at least one reference hole such as a valve stem hole extending therethrough at a predetermined location. The apparatus further comprises a light emitting source aligned on one side of the wheel assembly when the assembly is received by the punch station.

In keeping with the invention, the light emitting source is operative to emit a light beam. A light detecting target which is provided in electrical communication with the light emitting source is further aligned on the opposite side of the wheel assembly when received by the punch station and is further provided in electrical communication with the light emitting source. When the light emitting source is engaged during proper wheel assembly orientation, the light beam will pass through the reference hole, i.e. the valve stem hole and be received and detected by the target. There is further provided control circuitry in electrical communication with the light emitting source, the light detecting target and the punch station. The control circuitry is operative to engage the punch tooling so as to pierce lug holes through the wheel assembly if the light beam is received or abort the punching operation if the light beam is not received. A corresponding alarm signal may also be generated.

In operation, the method of the present invention is similarly directed for use in cooperation with a wheel truing machine having a punch station and punch tooling for effecting stamping operations of the type referenced above and, in particular, the piercing of lug holes in wheel assemblies. Again, each of the wheel assemblies must have at least one reference hole, preferably a valve stem hole, extending therethrough at a predetermined location. Following automatic transfer of the wheel assembly into the punch station, the wheel assembly is mechanically raised to the punch tooling whereupon a beam of light is directed from a light emitting source toward a light detecting target.

In keeping with the invention, the light emitting source is aligned on one side of the wheel assembly and the light detecting target, which is provided in electrical communication with the light emitted source, is aligned on the opposite side of the wheel assembly. This alignment is provided such that during proper wheel assembly orientation, the light beam emitted from the light emitting source will pass through the reference hole and be received by the light detecting target. Once the light beam has been emitted, detection circuitry within or associated with the light detecting target will be engaged to detect whether the light beam has been blocked or deflected due to a misalignment or, in the case of proper alignment, if the light beam has been received by the target. In either case, the light detecting target will generate an electrical signal corresponding to the present condition. This electrical signal is directed to control circuitry which is provided in electrical communication with the punch station and is operative to engage the punch tooling if the light beam is received or abort the punching operation if the light beam is not received. Again, a corresponding alarm signal may also be generated.

The above objects and other objects, features, and advantages of the present invention are readily apparent from the following detailed description of the best mode for carrying out the invention when taken in connection with the accompanying drawings in which like reference numerals correspond to like components.

BRIEF DESCRIPTION OF THE DRAWINGS

FIG. 4 is a schematic diagram of the light detection means and control circuitry of the present invention; and FIG. 5 is a generalized block diagram of the method steps of the present invention.

BEST MODES FOR CARRYING OUT THE INVENTION

Figure 1:
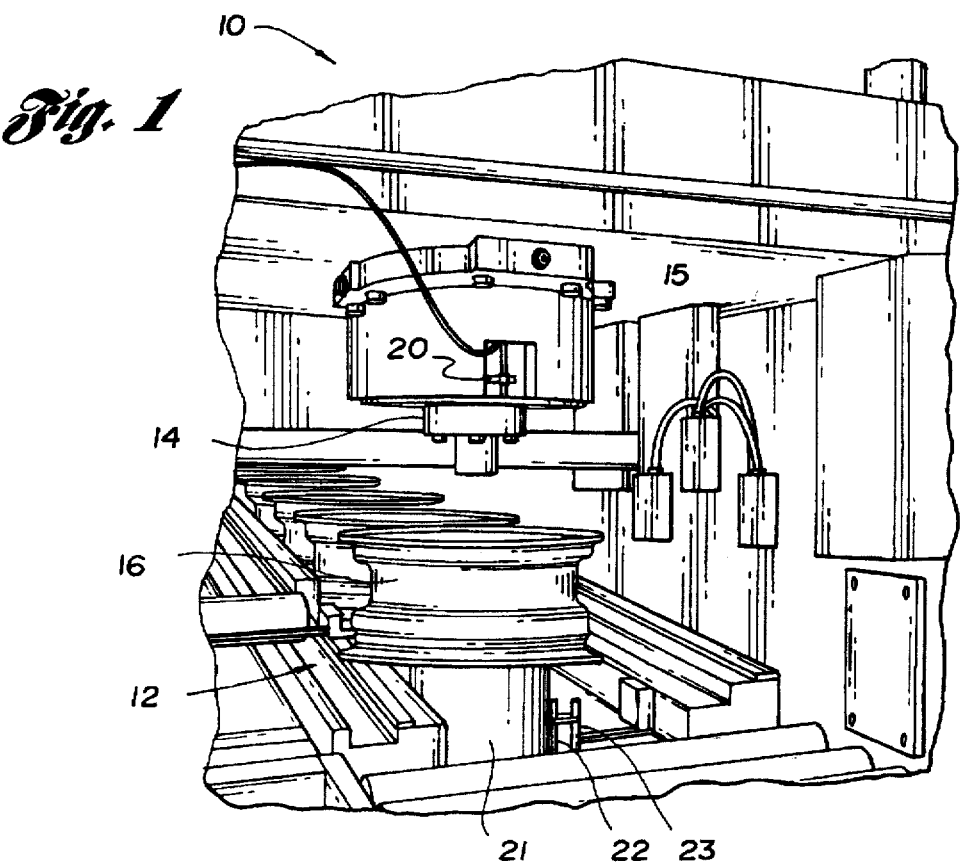
FIG. 1 is a perspective view of a wheel truing machine which incorporates the apparatus of the present invention for detecting misoriented wheel assemblies within its punch station.

With reference to the drawings, the preferred embodiments of the present invention will now be described in detail. As shown in FIG. 1, there is provided a perspective view of a wheel truing machine generally designated by reference numeral 10 which incorporates the apparatus of the present invention for detecting misoriented wheel assemblies prior to the initiation of stamping operations. Wheel truing machine 10 includes a punch station generally designated by reference numeral 12 and punch tooling 14 retained by punch housing 15 within punch station 12. Although not shown, wheel truing machine 10 may similarly include cutting tooling to perform selected truing operations as well.

As seen, in operation, wheel assemblies 16 are individually fed into punch station 12 in an automated process. If the wheel assemblies are properly oriented as determined in accordance with the present invention, lug holes may thereafter be punched or other stamping operations may be performed at relatively high speed as described further herein.

As referenced above, prior art truing machines have heretofore failed to incorporate any adequate means to detect whether wheel assemblies are in the correct positions within their associated punch stations prior to the initiation of stamping operations. As a result, the wheel assemblies were destined to receive punching regardless if the wheel assemblies were properly oriented for the particular punching operation. In many such instances, the wheel assemblies were, in fact, misoriented, thus resulting in the formation of lug holes which were pierced off center from their ideal location, out of tolerance or were otherwise misformed.

Figure 2:
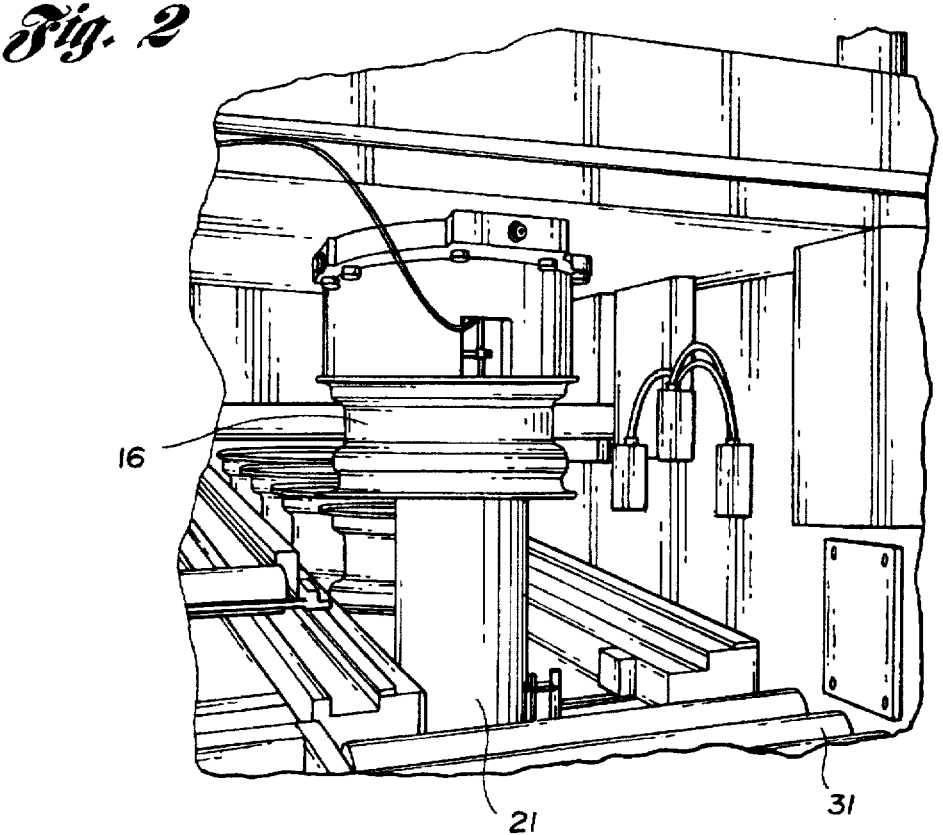
FIG. 2 is a perspective view of the apparatus of the present invention of FIG. 1 shown with its punch tooling in a punch-ready position.

To overcome these and other limitations of the prior art stamping procedures, the apparatus of the present invention incorporates a light emitting source 20 and a light detecting target 22 positioned in predetermined locations and orientations on opposing sides of wheel assemblies 16 within punch station 12. As shown in the preferred embodiment of FIGS. 2 and 3, light emitting source 20 is affixed to punch housing 15 and light detecting target 22 is affixed to a retaining bracket 23 within punch station 12. Light emitting source 20 and light detecting target 22 are preferably photoelectric fiberoptic sensors which are provided in electrical communication with one another and are operative to emit and receive infrared light signals, respectively.

In accordance with the invention, as the wheel assembly 16 is received within the punch station, the wheel assembly is mechanically engaged by a hydraulic arm or pedestal 21 which is operative to raise the assembly to punch tooling 14. Once placed in this "punch-ready" position, light emitting source 20 and light detecting target 22 are oriented such that a light signal or beam 24 will pass through a predetermined reference hole, such as, for example, a valve stem hole 26 for receipt by light detecting target 22. If light beam 24 is not so received, i.e. it is deflected or otherwise blocked, it may be inferred that the wheel assembly is misaligned and thus not ready for stamping operations. In like fashion, if light signal 24 is properly received, it may be inferred that wheel assembly 16 is in the proper position and orientation and stamping operations may be appropriately initiated.

In the preferred embodiment, light detecting target 22 includes detection circuitry for determining if light beam 24 has been received or deflected and further generating a corresponding electrical signal. This detection circuitry is provided in electrical communication with light emitting source 20 such that information is provided to light detecting target 22 whenever a light beam 24 has been generated for receipt. As shown in FIG. 4, control circuitry 30 is further provided in electrical communication with light detecting target 22 as well as punch tooling 14. In operation, as described in further detail and shown in FIG. 4, the electrical signal generated by the detection circuitry of light detecting target 22 is directed to control circuitry 30. Control circuitry 30 analyzes the received signal and generates a corresponding electrical signal operative to engage punch tooling 14 or, in the case of a detected misalignment, aborts the stamping operation and generates a corresponding alarm signal.

Operation

Figure 3:
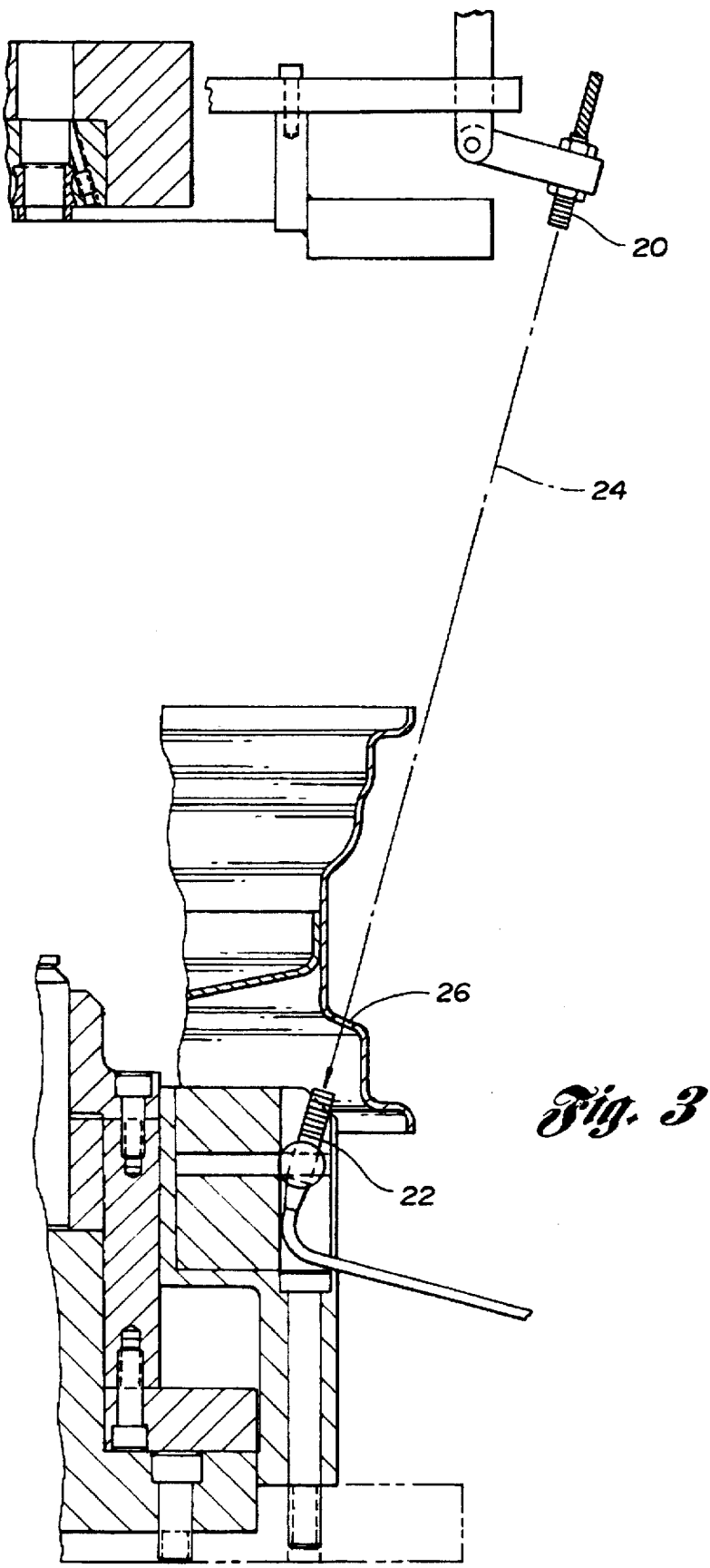
FIG. 3 is a cross-sectional view of the apparatus of the present invention of FIG. 1.

With reference to FIGS. 1, 3 and 5 of the drawings, the operation of the method of the present invention will now be described in further detail. Like the apparatus described above, the method of the present invention is directed specifically for use in cooperation with a wheel truing machine having a punch station 12 and punch tooling 14 retained by a punch housing 15 for piercing lug holes or performing other automated stamping operations in a plurality of wheel assemblies. The method is further specifically directed to the light detection of such misoriented wheel assemblies within their associated punch stations so as to prevent lug holes from being punched off location or otherwise out of tolerance.

The method comprises the initial transfer 32 of wheel assemblies 16 into punch station 12 and the raising 34 of wheel assemblies 16 via hydraulic arm 21 to punch tooling 14 in the "punch-ready" position referenced above. Thereafter, a light beam and preferably an infrared light beam 24 is directed 36 from a light emitting source aligned and oriented in a predetermined position on one side of wheel assembly 16 toward a light detecting target 22 which is similarly aligned and oriented in a predetermined position on the opposite side of wheel assembly 16. As referenced above, this alignment is necessary such that during proper wheel assembly orientation, light beam 24 will pass through reference hole 26 and be received by light detecting target 22 if, and only if, wheel assembly 16 is properly aligned in punch station 12.

As referenced above, and in keeping with the invention, light emitting source 20 and light detecting target 22 are provided in electrical communication with one another. Thus, upon emission of light beam 24, a corresponding electrical signal indicative of such emission is generated 38 by light emitting source 20 for receipt by the detection circuitry of target 22. In such manner, data is directly provided to light detecting target 22 that a light beam 24 has been emitted which should properly be received by light detecting target 22 if wheel assemblies 16 are properly oriented within punch station 12 in the punch ready position.

Following receipt of this information, and within a predetermined time frame during which the emitted signal 24 should have been received, the detection circuitry of light detecting target 22 will analyze its status 40 to determine if light signal 24 has been received. Thereafter, a corresponding electrical signal indicative of the analyzed status will be generated 42 for receipt by control circuit 30.

As referenced above, control circuitry 30 is provided in electrical communication with both light detecting target 22 and the punch tooling 14 of punch station 12. Upon receipt of the signal generated by the light detecting target, the control circuitry will further analyze 44 the received information and classify the same as either proper or improper wheel assembly orientation. In the case where there is a proper wheel assembly orientation, i.e. light beam 24 has been properly detected by light detecting target 22 and corresponding electrical signals have been generated and identified by control circuitry 30, punch tooling 14 will be engaged 44 and stamping operations will be initiated.

In contrast, where it is determined that wheel assembly 16 is not properly oriented, i.e. light beam 24 has been blocked, deflected or otherwise not properly received by light detecting target 22, control circuitry 30 will either abort the stamping operation or generate an alarm signal indicative of the undesired condition as shown in block 46. The alarm signal may comprise, for example, an audible tone as well as any suitable visual display such as blinking or flashing lights or the like.

In the situation described above, wherein wheel assemblies 16 are determined to be in a misaligned or misoriented position within punch station 12, in a preferred embodiment, control circuitry 30 may further generate an electrical signal operative to lower pedestal 21 and the corresponding wheel assembly 16 within punch station 12 from the "punch-ready" position therein. At such point, the misaligned wheel assembly may be realigned by hand or, in fully automated operations, the wheel assembly may be discarded on a separate line and later re-fed into punch station 12 along with other wheel assemblies which have accumulated from discarding operations.

In contrast, in situations wherein wheel assemblies 16 are determined to be in proper position and orientation, the selected stamping operations will be effected and, thereafter, hydraulic pedestal 21 will be disengaged so as to lower wheel assembly 16 within punch station 12 and place the same in mechanical contact with rollers 31 or similar transportation means for removing wheel assembly 16 from punch station 12 following stamping operations. Following release of wheel assembly 16 from pedestal 21, the next successive wheel assembly 16 will be fed into punch station 12 whereupon it will be engaged in like fashion by pedestal 21 and raised to the "punch-ready" position. Thereafter, the method steps of the present invention will be repeated automatically to determine once again if the wheel assembly 16 is properly oriented before effecting stamping operations.

As readily seen, the automatic process effected by the apparatus and method of the present invention provides a simple and inexpensive means of confirming that wheel assemblies are properly oriented before effecting selected stamping and cutting operations and thus reduces, if not eliminates, the possibility that the above operations will be performed outside of the desired accuracy sought by the user.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

We claim:

1. For use in cooperation with a wheel truing machine having a punch station and punch tooling for effecting selected stamping operations in a wheel assembly, said wheel assembly having at least one reference hole extending therethrough at a predetermined location, a method for detecting misoriented wheels so as to ensure that said stamping operations are performed within the desired accuracy, comprising:

transferring said wheel assembly into said punch station;

raising said wheel assembly to said punch tooling;

directing a light beam from a light emitting source aligned on one side of said wheel assembly toward a light detecting target aligned on the opposite side of said wheel assembly, such that during proper wheel assembly orientation, said light beam passes through said reference hole and is received by said light detecting target;

detecting whether said light beam is received by said target; and engaging said punch tooling to effect said stamping operations in said wheel assembly if said light beam is detected.

2. The method of claim 1, further comprising:

generating a first electrical signal indicative of whether said light beam is received by said light detecting target; and providing control circuitry in electrical communication with said punch station operative to receive said first electrical signal and generate a corresponding second electrical signal to engage said punch tooling if said light beam is received and operative to generate an alarm signal and abort said stamping operations if said light beam is not received.

3. For use in cooperation with a wheel truing machine having a punch station and punch tooling for piercing lug holes in a wheel assembly, said wheel assembly having a valve stem hole extending therethrough at a predetermined location, a method for detecting misoriented wheels so as to prevent lug holes from being punched off location, comprising:

transferring said wheel assembly into said punch station;

raising said wheel assembly to said punch tooling;

generating an infra-red light beam from a fiber optic photoelectric light source aligned on one side of said wheel assembly toward a fiber optic photoelectric target aligned on the opposite side of said wheel assembly, such that during proper wheel assembly orientation, said light beam passes through said valve stem hole and is received by said target;

detecting whether said light beam is received by said target;

generating a first electrical signal indicative of whether said light beam is received by said light detecting target; and providing control circuitry in electrical communication with said punch station operative to receive said first electrical signal and generate a corresponding second electrical signal to engage said punch tooling if said light beam is received and operative to generate an alarm signal and abort said punching operation if said light beam is not received.

4. A wheel truing machine for use in cooperation with a wheel assembly having at least one reference hole extending therethrough at a predetermined location, comprising:

a punch station operative to receive said wheel assembly and having punch tooling;

engagement means for engaging said punch tooling in mechanical contact with said wheel assembly;

a light emitting source aligned on one side of said wheel assembly when said wheel assembly is received by said punch station, said light emitting source operative to emit a light beam;

a light detecting target in electrical communication with said light emitting source and aligned on the opposite side of said wheel assembly when said wheel assembly is received by said punch station, such that when said light emitting source is engaged during proper wheel assembly orientation, said light beam passes through said reference hole and is detected by said target; and control circuitry in electrical communication with said light detecting target and said engagement means, said control circuitry operative to cause said stamping operations to be initiated if said light beam is received and operative to abort said stamping operations if said light beam is not received.

5. The wheel truing machine of claim 4, wherein said light emitting source is a fiber optic cable which emits an infra-red light beam.

6. The wheel truing machine of claim 4, wherein said light detecting target is a fiber optic photoelectric sensor.

7. The wheel truing machine of claim 4, wherein said reference hole is a valve stem hole.

8. For use in cooperation with a wheel truing machine having a punch station and punch tooling for piercing lug holes in a wheel assembly, said wheel assembly having at least one reference hole extending therethrough at a predetermined location, an apparatus for detecting misoriented wheels so as to prevent lug holes from being punched off location, comprising:

a light emitting source aligned on one side of said wheel assembly when said wheel assembly is received by said punch station, said light emitting source operative to emit a light beam;

a light detecting target in electrical communication with said light emitting source and aligned on the opposite side of said wheel assembly when said wheel assembly is received by said punch station, such that when said light emitting source is engaged during proper wheel assembly orientation, said light beam passes through said reference hole and is detected by said target; and control circuitry in electrical communication with said light detecting target and said punch station, said control circuitry operative to engage said punch tooling so as to pierce said lug holes through said wheel assembly if said light beam is received and operative to abort said punching operation if said light beam is not received.

9. An apparatus as in claim 8, wherein said light emitting source is a fiber optic cable which emits an infra-red light beam.

10. An apparatus as in claim 9, wherein said light detecting target is a fiber optic photoelectric sensor.

11. An apparatus as in claim 8, wherein said reference hole is a valve stem hole.

* * * * *